Patented Feb. 3, 1925.

1,525,317

UNITED STATES PATENT OFFICE.

JEAN PAISSEAU, OF PARIS, FRANCE.

PROCESS OF PREPARATION OF PEARL ESSENCE.

No Drawing.　　　Application filed August 10, 1921.　Serial No. 491,310.

*To all whom it may concern:*

Be it known that I, JEAN PAISSEAU, a citizen of the Republic of France, and residing at Paris, Seine Department, No. 53 Rue de Chateaudun, in the Republic of France, have invented certain new and useful Improvements in Processes of Preparation of Pearl Essence, of which the following is a specification.

A product is in general use and known as pearl essence which consists of an emulsion in water, and generally in ammoniacal water, of the brilliant particles extracted usually from the scales of the bleak fish. When agitated, the said emulsion gives rise to brilliant waves of a silky appearance, and when allowed to stand, it leaves a sediment which after settling has the brilliant metallic aspect of polished silver. Microscopic examination of a sample of commercial essence of pearl shows that the brilliant portion of this latter is constituted by elongated crystalloids which are white and refringent. But as a rule these crystalloids are mixed with numerous impurities such as amorphous organic particles and living or dead microbes. I have ascertained that by the use of suitable treatment, all animal tissues or waste portions may become a source of pearl essence.

1. *Scales.*—The scales of the bleak fish constitute the type of raw material to be employed, and in fact it is this product which is especially used at the present time. The histological examination of a scale of the said fish makes it evident that the pearly appearance of the same is due to the presence of closely juxtaposed crystalloids in the midst of the epithelial cells which form the internal layer of the scale. The same is true for the scales of all fish of a brilliant appearance whether colored or white. The differences only relates to the extent of the brilliant surface of the scale.

2. *Swimming bladders.*—In the same manner as for the scales, the swimming bladder of certain fish is of a brilliant and silvery appearance, this being the case for the argentine, which is already used, as well as for the herring anchovy, smelt and others. In this case the crystalloids are distributed throughout the epithelium of the outer covering of the organ; their form is different from what prevails in the scales, and for this reason the resulting product possesses particular qualities.

3. *Teguments.*—The skin of a considerable number of brilliant fish such as the herring, sardine and the like when freed from the scales covering the same, is observed to retain a silvery appearance, this being also due to crystalloids of a similar nature which constitute a source of the pearl essence. On the other hand, the peritoneal covering in certain fish such as the smelt, exhibits like characteristics.

4. *Excrements of birds.*—Inasmuch as the said crystalloids are not acted upon by the digestive diastases, it will result that the excrement of fish-eating birds, and especially the guano of Chile, may be used for the preparation of pearl essence.

5. *Insects.*—Even insects are observed to possess analogous properties, and it will be sufficient to mention the butterflies having an iridescent or pearly lustre whose mirror-like appearance is entirely due to deposits of crystals which are similar to those of fish. The known process of manufacture which is generally employed is based upon the use of a 1 to 5% ammoniacal water. It is shown by hundreds of years' practice that this process is susceptible of producing desirable results, especially with the scales of fresh water fish, and more particularly with the bleak fish. It is evident that such action as churning, shaking or stirring in water, or kneading the scales by hand, will have the effect of detaching the brilliant protoplasmic film by the friction employed. This latter will become broken up by reason of its thinness, and the crystalloids will be more or less separated, but they will still remain imbedded in a protoplasmic substance which reduces their brilliancy.

For this reason the said product will only become improved in quality after a series of repeated washings and settlings, and this will often require six months of successive manipulations. When in the alkaline bath, the protoplasmic surrounding substance becomes finally dissociated, and this will account for the gradual diminution of the volume of the pearl essence after a certain length of time.

The same result may however be produced in a few hours and with all the varieties of raw material as above set forth, by making use of the process according to my invention. The major part of the antiseptic substances are not to be employed, inasmuch as they will act to change or to destroy the brilliancy of the product. I have ascertained that the arsenites or the arsenates of sodium or potassium, as well as other arsenical products, will on the contrary afford perfect results when employed in a solution of 2 to 5 per 1000. The scales, preferably contained in a sack, are immersed in this solution, and after a few hours they are drained and then stored in kegs or boxes.

The process of preparation of pearl essence which constitutes the object of my invention consists in principle in the rapid separation of the crystalloids from the various material containing the same—not only from the scales of fresh water fish but likewise from all parts of any kind of fish either fresh water or sea water, from insects, or the like—by dissolving, destroying and removing the protoplasm which surrounds the said crystalloids. The protoplasm may be destroyed by submitting the same to the action of all suitable chemical substances which have no action upon the crystalloids, and by making use of means for aiding the process if desired, comprising physical means such as heat or mechanical means such as churning, grinding or the like. For instance the raw material may be submitted to the action of various detersive substances susceptible of dissolving or dissociating the protoplasm, the fatty substances or the like which constitute the material inclosing the said crystalloids.

The crystalloids are then separated from the liquid resulting from the above-mentioned treatment, either by physical means such as settling or by mechanical means such as centrifugal treatment, or the like. By this process the crystalloids may be separated in a few hours from the raw material employed, such crystalloids being well cleaned off and constituting a pearl essence of an attractive quality. This process is applicable not only to the treatment of the above-mentioned raw material, but also for the refining of pearl essence which has been prepared by the usual method, and in this case the refining process will now become extremely rapid instead of lasting for several months. Among the detersive substances available for this purpose may be mentioned in the first place neutral soap, saponine and the like, or substitute products, and all bodies containing such substances.

*Example I.*—A rapid purification may especially be obtained by the use of neutral soap (medicinal soap). Supposing that the raw material consists of crude pearl essence, or sediment of 24 hours' standing, prepared according to the usual method, the process may be practically carried into effect in the following manner:

Mix: Sediment of 24 hours, 2 to 4 liters; distilled water, 6 liters; soap, 50 to 100 grammes.

Heat in the water bath at 35 to 60° C. for 2 to 3 hours, stirring in the meanwhile.

When the operation is finished, the product is diluted with double the amount of distilled water, stirred energetically and then distributed in various jars. At the end of a time which varies with the degree of purity of the pearl essence used in the process, a layer of undissolved impurities is deposited and the liquid is drawn off from the latter by the siphon. When the said liquid is allowed to stand it will deposit the cleaned pigment in 24 to 48 hours. A second use of the siphon will draw off the waste water which has a blackish appearance. The deposit is then taken up once or twice by distilled water and at the end of these operations it will constitute a practically pure essence. The purifying process may be expedited by the use of centrifugal apparatus.

*Example II.*—Saponine will act in the same manner as soap.

The following ingredients are used, for instance: Crude essence (24 hrs. sediment) 2 to 6 liters (according to the purity); saponine, 15 grammes; distilled water, quantity sufficient to make up 10 liters.

Heat in the water bath at 35 to 60° C. for 3 hours, with frequent stirring, then distribute the mixture in various jars for the deposit, diluting with a sufficient amount of distilled water. The first decantation by the siphon in 2 to 4 hours will remove the waste residues which do not contain the brilliant pigment. The liquid contains in suspension the brilliant pigment which is in the separated and cleaned state, this being slowly deposited, and after a sufficient washing it constitutes a pearl essence of an incomparable fineness and brilliancy.

Identical results are obtained by the use of all bodies possessing detersive properties similar to those of soap and saponine, or containing these latter, and not susceptible of acting upon the brilliant pigments. It is also evident that in the present case the relatively high temperature of the mixture has preponderant action. This high temperature also possesses the advantage of affording a veritable sterilization of the liquid and of preventing all microbe fermentation without requiring the addition of antiseptic substances.

This process may be very advantageously employed in the direct treatment of scales, teguments and bladders of fresh and salt water fish in the fresh state or salted, smoked or preserved in any suitable manner. It is recognized that the usual methods cannot be employed for the extraction of pearl essence from the extremely brilliant and attractive scales of the herring, for instance, to mention one of the most common of the sea fish. This is due to the fact that when kneading or churning the same in the cold state with ammonia or with the carbonate, the brilliant film which covers the scale is entirely detached therefrom, and the brilliant pigment imbedded in the film is not released. On the other hand, the ammonia exerts a rapid destructive action upon this essence.

An excellent result is obtained by a hot treatment of the scales, for instance from 35 to 65° C. in a 10% solution of soap or a 1 to 5% solution of saponine, or even a 2% carbonate of ammonia solution. The brilliant film becomes gradually disaggregated, and the crystals are set free; the treatment is finished when the scales have been entirely cleared off. It will suffice to separate the liquid which contains the pearl essence in suspension by means of a sieve filter, and two or three washings will bring the same to the desired degree of purity.

*Swimming bladders.*—Should the treatment of this raw material be hindered by a large proportion of fatty substances, the following method may be employed. A washing in the first place in running water will remove the major part of the soluble impurities as well as a portion of the non-adherent fatty substances. The bladders which are previously dried on a frame while protected from the sun are piled up in layers in suitable receptacles filled with any suitable solvent for fatty substances, this latter being renewed until all the fatty substances are removed which are susceptible of being dissolved in the said solvent, or the operation is preferably carried out by the use of an extracting device with continuous circulation. For the final treatment, the solvent with which the bladders are impregnated is evaporated by a current of air or removed by any other suitable process, whereupon the bladders are submitted to a churning action in distilled water containing if required ammonia or carbonate of ammonia.

The crude pearl essence which is obtained by this treatment is then purified by one of the above-mentioned processes.

Claims:

1. A process of preparation of pearl essence comprising in treating the raw material containing the brilliant crystalloids with a reagent which is susceptible of rapidly removing the protoplasm wherein the said crystalloids are imbedded, after which the crystalloids thus set free are separated from the said reagent before being acted upon by the latter.

2. A process of preparation of pearl essence comprising in treating the raw material containing the brilliant crystalloids in a heated state with a reagent which is susceptible of rapidly removing the protoplasm wherein the said crystalloids are imbedded, after which the crystalloids thus set free are separated from the said reagent before being acted upon by the latter.

3. A process of preparation of pearl essence comprising in adding alkali metal salts of arsenic acids to the raw material containing the brilliant crystalloids and subsequently subjecting the treated material to a reagent which is susceptible of rapidly removing the protoplasm wherein the said crystalloids are imbedded, after which the crystalloids thus set free are separated from the said reagent before being acted upon by the latter.

4. A process of preparation of a pearl essence comprising in treating all the silvery parts of the bodies of fish by a reagent susceptible of rapidly removing the protoplasm wherein the brilliant crystalloids are embedded, after which the crystalloids thus set free are separated from the said reagent before being acted upon by the latter.

5. A process of preparation of pearl essence consisting in treating the raw material containing the brilliant crystalloids with reagents suitable for setting free partially the crystalloids of the organic material in which they are incorporated and then heating this impure mass of crystalloids with saponine at a temperature of about 35°–65° C. for three hours, after which the crystalloids thus set free are separated by settling.

6. A process of preparation of pearl essence comprising in treating the swimming bladders with a solvent repeatedly renewed until the entire amount of fatty matter is dissolved, and are subsequently dried in a current of air and then submitted to a churning action with distilled ammoniacal water.

In testimony that I claim the foregoing as my invention I have signed my name in presence of a subscribing witness.

JEAN PAISSEAU.

Witness:
MAURICE ROUX.